(12) United States Patent
Bindhammer

(10) Patent No.: US 11,027,345 B2
(45) Date of Patent: Jun. 8, 2021

(54) MITER SAW AND WORKPIECE SUPPORT THEREFOR

(71) Applicant: Scheppach Fabrikation von Holzbearbeitungsmaschinen GmbH, Ichenhausen (DE)

(72) Inventor: Markus Bindhammer, Friedberg (DE)

(73) Assignee: Scheppach Fabrikation von Holzbearbeitungsmaschinen GmbH, Ichenhausen (DE)

( * ) Notice: Subject to any disclaimer, the term of this patent is extended or adjusted under 35 U.S.C. 154(b) by 0 days.

(21) Appl. No.: 16/186,015

(22) Filed: Nov. 9, 2018

(65) Prior Publication Data

US 2019/0143426 A1 May 16, 2019

(30) Foreign Application Priority Data

Nov. 15, 2017 (EP) ..................................... 17020534

(51) Int. Cl.
*B23D 45/04* (2006.01)
*B23D 47/02* (2006.01)
(Continued)

(52) U.S. Cl.
CPC ......... *B23D 47/025* (2013.01); *B23D 45/044* (2013.01); *B23D 45/048* (2013.01);
(Continued)

(58) Field of Classification Search
CPC .... B23D 45/04; B23D 45/042; B23D 45/044; B23D 45/046; B23D 45/048; B23D 47/025; B23D 47/02; B27B 5/29; B27G 19/02; B27G 19/04; Y10T 83/7697; Y10T 83/7705; Y10T 83/7722; Y10T 83/7726; Y10T 83/773; Y10T 83/7755;
(Continued)

(56) References Cited

U.S. PATENT DOCUMENTS 3,952,239 A * 4/1976 Owings et al. ........... B25F 3/00
320/113
6,550,363 B2 * 4/2003 He ....................... B23D 45/048
83/471.3
(Continued)

FOREIGN PATENT DOCUMENTS

DE 102007011167 A1 11/2007

*Primary Examiner* — Clark F Dexter
(74) *Attorney, Agent, or Firm* — Falk Ewers; Ewers IP Law PLLC

(57) ABSTRACT

A miter saw and a workpiece support are provided. The workpiece support has a circular disc-shaped turntable penetrated by a saw blade slot serving as a passage for the saw blade lowered into the working position, a holder on one side for fastening the saw unit, and a radial arm which extends the turntable and the saw blade slot in the longitudinal direction of the slot radially outwards on a side opposite the holder. A radial arm connection is provided, on which the radial arm is detachably and co-rotatably attached to the turntable, or on which a radially outer radial arm outer portion of the radial arm is detachably and co-rotatably attached to a radially inner radial arm inner portion of the radial arm formed integrally with the turntable. The miter saw has blade that can be moved transversely and lowered from a position above the workpiece support.

9 Claims, 4 Drawing Sheets

(51) Int. Cl.
*B27B 5/29* (2006.01)
*B27G 19/02* (2006.01)

(52) U.S. Cl.
CPC ............... *B27B 5/29* (2013.01); *B27G 19/02* (2013.01); *Y10T 83/7693* (2015.04); *Y10T 83/7697* (2015.04); *Y10T 83/773* (2015.04); *Y10T 83/7788* (2015.04)

(58) Field of Classification Search
CPC ............ Y10T 83/7763; Y10T 83/7768; Y10T 83/7772; Y10T 83/7776; Y10T 83/778; Y10T 83/7784; Y10T 83/7788; Y10T 83/8773; Y10T 83/7693
USPC ........ 83/471.3, 473, 490, 477, 477.1, 477.2, 83/483, 485, 486, 486.1, 487–489, 581, 83/471.2
See application file for complete search history.

(56) References Cited

U.S. PATENT DOCUMENTS

| | | | |
|---|---|---|---|
| 7,845,260 B2* | 12/2010 | Terashima et al. | B23D 45/048 83/471.3 |
| 8,555,762 B1* | 10/2013 | Jones | B23Q 16/001 83/471.3 |
| 2002/0144582 A1* | 10/2002 | He | B23D 45/048 83/473 |
| 2007/0214927 A1 | 9/2007 | Terashima et al. | |
| 2017/0136560 A1 | 5/2017 | Chiang et al. | |

\* cited by examiner

MITER SAW AND WORKPIECE SUPPORT THEREFOR

CROSS REFERENCE TO RELATED APPLICATIONS

This application claims priority to European patent application EP 17 020 534.8, filed Nov. 15, 2017, the entire content of which is incorporated herein by reference.

TECHNICAL FIELD

The invention relates to a workpiece support for a miter saw and a miter saw equipped with such a tool support.

BACKGROUND

Miter saws of the generic type are available in a simple version as cross-cut saws, in which the saw blade can be lowered from a rest position to its working position from above, usually swung down, and in further development as cross-cut pull saws, wherein the saw blade or the saw unit carrying the saw blade can also be moved in the transverse direction to make room for wider workpieces. US patent application US 2017/0136560 A1, for example, shows such a cross-cut miter saw.

The miter saw has a turntable rotatably mounted on a saw stand, which in turn has a holder on which the saw unit with the saw blade can be swiveled up and down, but is connected to the turntable in a rotationally fixed manner. The miter angle at which the workpiece is to be sawn can then be set by turning the turntable relative to the saw stand. The saw stand can be equipped with stops that can be fixed to bring the workpiece into the desired position, i.e., mitered relative to the saw blade swiveled out together with the turntable. In order to be able to cut relatively wide boards to a desired length, the saw unit can not only be swiveled up and down, but can also be moved longitudinally. In order to provide the necessary extension of the plunging slot for the saw blade, the turntable is equipped with a radially projecting cantilever arm into which the plunging slot extends. The arm can also be used as a handle for turning the turntable relative to the saw stand.

German patent application DE 10 2007 011 167 A1 also shows a miter saw of this type, which, however, has a hinged or removable arm attached to the turntable. This allows the transport volume of the miter saw to be reduced. An axle pin and a connecting element are provided to link the arm to the turntable.

SUMMARY

Starting therefrom, it is an object of the present invention to create a tool support for a miter saw and a miter saw equipped with such a tool support, which allow a reduced transport volume with a simple construction.

This object is achieved by a workpiece support and a miter saw as disclosed herein.

A generic workpiece support for a miter saw is suitable for rotatably mounting it to a saw stand and for co-rotating fastening thereto a saw unit with a saw blade that can be lowered from a position above the workpiece support. In the case of a cross-cut miter saw, the saw blade can be moved or displaced in the transverse direction, whereas in the case of a pure cross-cut miter saw it cannot be moved or displaced transversally. Further, the generic workpiece support has an in particular circular disc-shaped turntable which is penetrated by a saw blade slot serving as a passage for the saw blade lowered into the working position and has a holder on one side for attaching the saw unit comprising the saw blade. Moreover, a radial arm is provided, which extends the turntable and the saw blade slot radially outwards in the longitudinal direction of the slot on an opposite side of the holder.

Further, a radial arm connection is provided, on which the radial arm is attached removably and co-rotatably to the turntable. Alternatively, a radially inner radial arm inner portion formed in one piece with the turntable can be provided, on which a radially outer radial arm outer portion of the radial arm is attached removably and co-rotatably.

According to an aspect of the invention, the radial arm connection is formed as a dovetail connection of the radial arm and the turntable or of the radial arm outer portion and the radial arm inner portion. A dovetail connection is highly form-fit in the transverse and longitudinal directions. The radial arm connection has on each of both sides of the saw blade slot an insertion pin formed as a dovetail projection and an insertion receptacle formed as a dovetail receptacle and being assigned to the respective dovetail projection. This results in a secure fastening, at least in the longitudinal direction, transverse direction and in all possible torque directions, with a correspondingly good fit.

Further, in accordance with another aspect of the invention, a locking device is provided for releasably locking the radial arm connection with the radial arm attached to the turntable or with the radial arm outer portion attached to the radial arm inner portion. The locking device has a cross bar or transverse bolt which can be inserted or pushed into a bar or bolt receptacle in a direction transverse to the saw blade slot. Since the saw blade slot must remain free for sawing, the bolt receptacle and the inserted transverse bolt extend transversely to the saw blade slot at least through one side wall up to one of the insertion pins or only through this one insertion pin, such that the saw blade slot remains free for sawing. However, it would be conceivable to provide a slot insert that prevents the saw from being put into operation in a transport condition without the radial arm attached by blocking the saw blade slot. The slot insert must then be removed before mounting the arm.

Another advantage in terms of simple operation is the provision of an actuating device for the locking device, for example a hand knob attached to the transverse bolt, which allows the transverse bolt to be inserted and withdrawn easily.

The locking device can then serve on the one hand as additional protection against an undesired relative movement of the radial arm relative to the turntable or of the radial arm outer portion relative to the radial arm inner portion and on the other hand as height fixing of the radial arm on the turntable or of the radial arm outer portion on the radial arm inner portion.

With the inventive design of the radial arm connection as a dovetail connection, the connection between the radial arm and the turntable or between the radial arm inner portion and the radial arm outer portion cannot be made in butt joint, but from above or from below. In addition, it would be conceivable to form the dovetail receptacle or receptacles closed on the underside so that the dovetail projection to be inserted from above can also be supported on the underside. In height direction, a sliding support on the saw stand can then serve as support. However, it is preferable if the radial arm connection is designed in such a way that the radial arm can be attached to the workpiece support or the radial arm outer portion can be attached to the radial arm inner portion from below. The dovetail receptacles must then be correspondingly open towards the bottom and are advantageously continuous and thus also open towards the top.

Additionally, a fitting projection can be provided on the radial arm or on the radial arm outer portion. The fitting projection projects between the two insertion pins towards the workpiece support and engages under the workpiece support or the radial arm inner portion when the radial arm or radial arm outer portion is attached to the workpiece support or to the radial arm inner portion and fits into a corresponding receptacle on the workpiece support or the radial arm inner portion.

The radial arm connection can be formed as a plug-in connection of the radial arm and the turntable. If only the radial arm outer portion arranged radially on the outside is removable, the radial arm connection designed as a plug-in connection is located at the interface between the radial arm outer portion and the radial arm inner portion. Advantageously, the plug-in connection is made to be form-fit, i.e., it fits snugly. A snap-in connection would also be conceivable.

The radial arm connection can have at least one insertion pin projecting radially inwards from the radial arm or radial arm outer portion, wherein the workpiece support or the radial arm inner portion can then have a insertion receptacle for each insertion pin.

The miter saw in accordance with the invention has a saw stand and, rotatably mounted on it, a workpiece support of the inventive type. Therein, a saw unit is attached to the workpiece support so as to rotate together with the workpiece support. The saw unit has a saw blade which can be lowered from a position above the workpiece support into a working position and which is displaceable transversally or not.

Transversally displaceable or movable means that the saw blade or the saw unit holding the saw blade is mounted on the turntable of the workpiece support in such a way that the saw blade can perform a movement with at least one directional component along the saw blade slot, not necessarily a pure transverse movement, in addition to the pivoting movement.

The detachability of the radial arm or at least its outer radial arm outer section results on the one hand in an even smaller packing size than with a pivotable radial arm. On the other hand, the connection of the radial arm to the turntable or of the radial arm outer portion to the radial arm inner portion can be realized easily, without or at least with only a few additional components, and thus cost-effectively, with simple handling.

It is also advantageous if a fixing lever is attached to the underside of the removable radial arm or the removable radial arm outer section, which is part of a fixing device for fixing the workpiece support to the saw stand. For miter saws of the generic type, fixing devices are required to fix the workpiece support to the saw stand in a working position with the desired miter angle relative to the saw stand. These fixing devices usually have corresponding actuating or fixing levers on the side facing the user. If the fixing lever is provided on the underside of the removable radial arm or of the removable radial arm outer portion, only one hand is required to release the fixing device and to rotate the workpiece support relative to the saw stand into a desired miter position.

It is also advantageous if the saw blade slot is surrounded by an exchangeable table insert so that the area around the saw blade slot exposed to high loads during sawing can be renewed. The table insert is advantageously made of an easily machinable material such as plastic, so that a misalignment of the saw blade with the saw blade slot does not immediately lead to a serious collision. Since the saw blade slot extends along the radial arm and into the turntable, it is particularly preferred if the table insert comprises a turntable-side insert piece and a radial arm-side insert piece, wherein when the radial arm is divided into a radial arm inner portion integrally mounted on the turntable and a removable radial arm outer portion, the turntable-side insert piece extends to the radial arm connection and the radial arm-side insert piece extends in the radial arm outer portion.

BRIEF DESCRIPTION OF THE DRAWINGS

The invention will now be described with reference to the drawings wherein.

DESCRIPTION OF EXEMPLARY EMBODIMENTS

Figure 1:
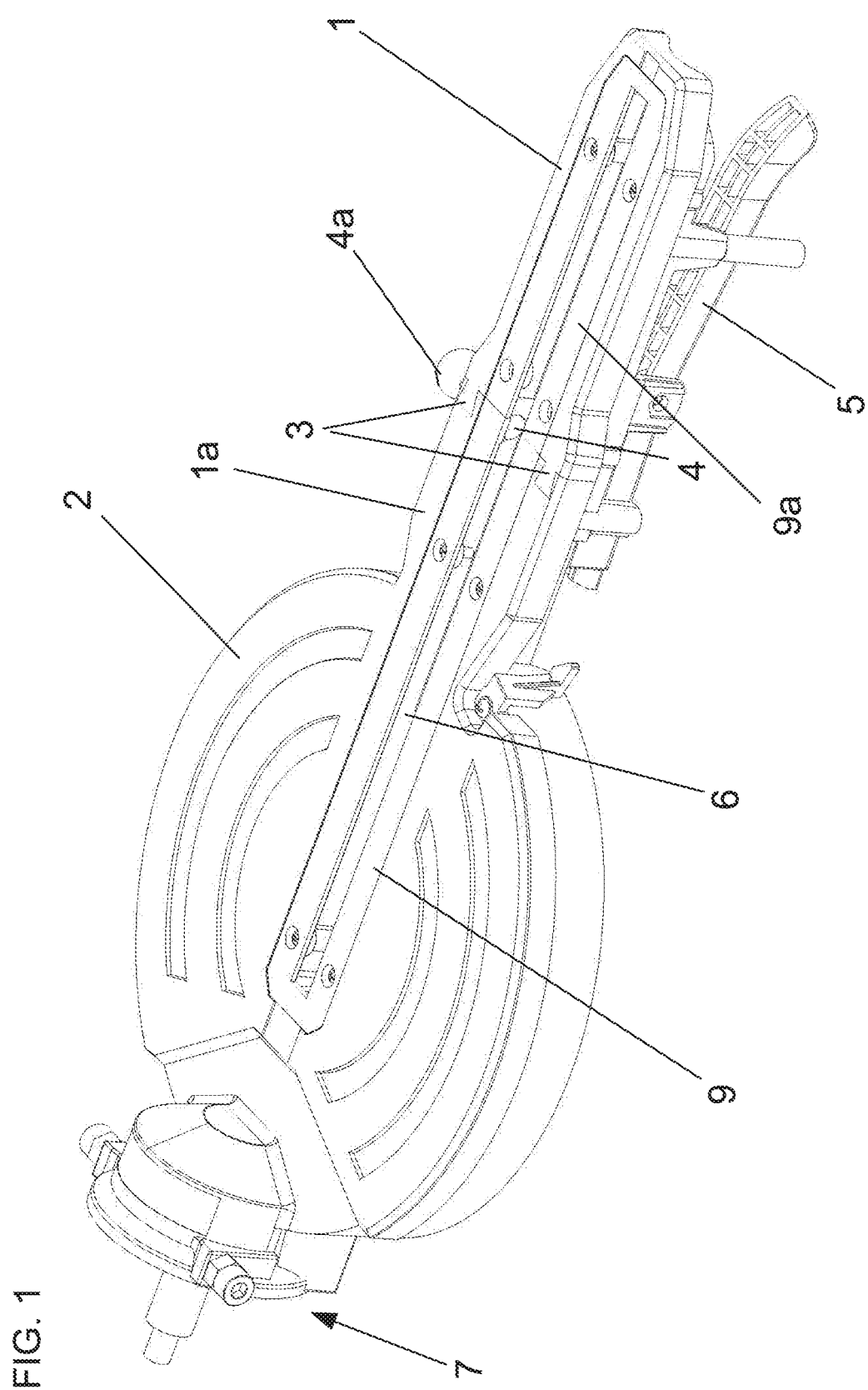
FIG. 1 is a perspective view from diagonally above on a workpiece support in an assembled condition according to an exemplary embodiment of the invention.
Figure 2:
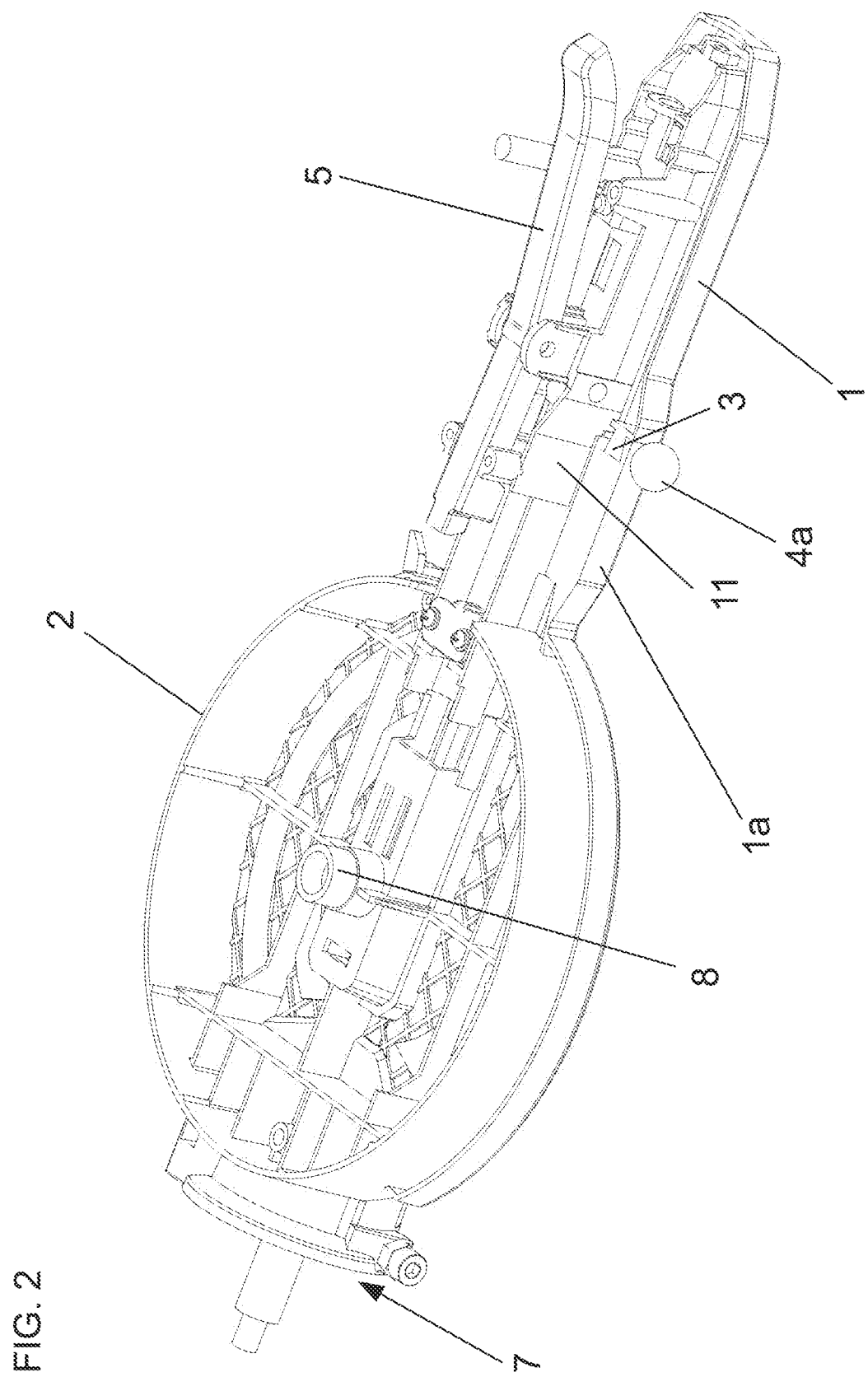
FIG. 2 is a perspective view of the workpiece support shown in FIG. 1 from diagonally below in an assembled condition.
Figure 4:
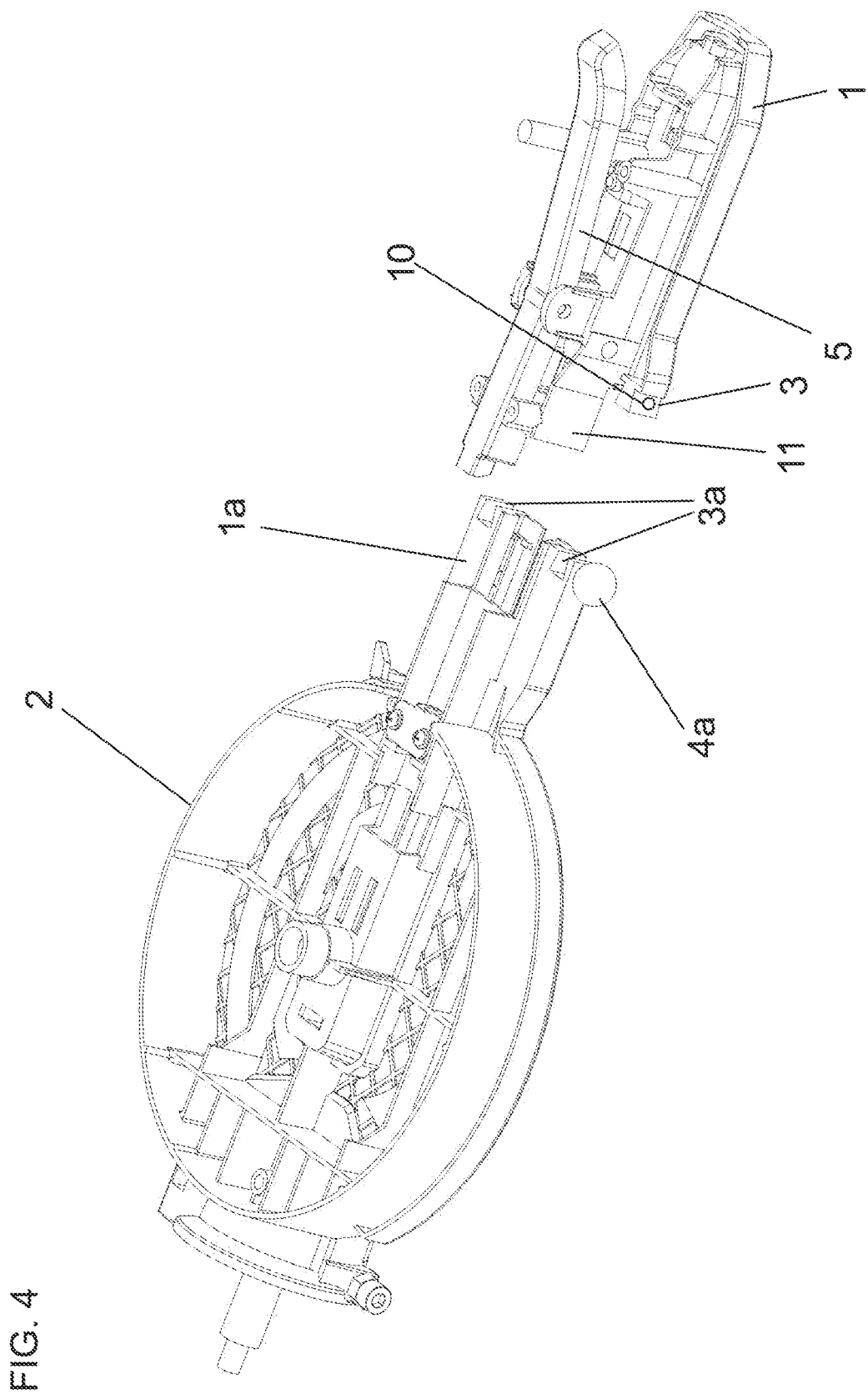
FIG. 4 is a view of the workpiece support shown in FIGS. 1 to 3 corresponding to FIG. 2, but with the radial arm outer portion removed.

The workpiece support shown in the figures has a turntable 2, on which a radial arm inner portion 1a, also referred to as an inner radial boom section 1a, projecting in a radial direction is integrally formed in one piece, onto which in turn a radially outer radial arm outer portion 1, also referred to as an outer radial boom section 1, extending further radially outwards in the assembled state of the workpiece support is attached. In FIGS. 2 and 4 it can be seen an underneath pivot receptacle 8 in the center of the turntable 2, at which the turntable can be placed on a pivot of a saw stand of a miter saw.

A saw blade slot 6 extends along the radial direction of the radial arm 1, 1a. The saw blade slot 6 can be penetrated by a saw blade of the saw to be lowered from above during sawing. A holder 7 is provided on the side of the turntable 2 opposite to the radial arm 1, 1a of the turntable 2. The saw unit of the miter saw equipped with the tool support can be attached to the holder 7 in a rotationally fixed manner, i.e., co-rotatably with the turning of the turntable. The way in which the saw unit is attached to the holder 7 provided for this purpose is not explained in detail here, because this can be solved in a manner known to skilled persons, for example by an upwardly projecting support to be attached to the holder 7, which can have a swivel head with the saw blade and, in the case of a cross-pull saw, corresponding guides.

The saw blade slot 6 is surrounded by a table insert 9, 9a, which consists of an easily machinable material such as plastic and is made of two parts: a turntable side insert part 9 and a radial arm side insert part 9a. The turntable side insert part 9, which surrounds the saw blade slot 6 in the region of the turntable 2 and in the region of a radial arm inner portion 1a, is screwed to the turntable 2 and to the radial arm inner portion 1a with screws and with a flush surface, whereas the radial arm side insert part 9a which extends in the region of the radial arm outer portion 1, can also be fastened there flush with screws.

The radial arm outer portion 1 is connected to the component consisting of turntable 2, holder 7 and radial arm inner portion 1a, also referred to as radial arm inner portion 1a, by a radial arm connection 3, 3a formed as a dovetail connection. Insertion pins 3, 3 in the form of two dovetail-shaped projections 3, 3 or dovetail projections 3, 3 projecting from the end face of the radial arm outer portion 1 facing the radial arm inner portion 1a, to which two corresponding dovetail receptacles 3a on the radially outward end face of the radial arm inner portion 1a are assigned.

Figure 3:
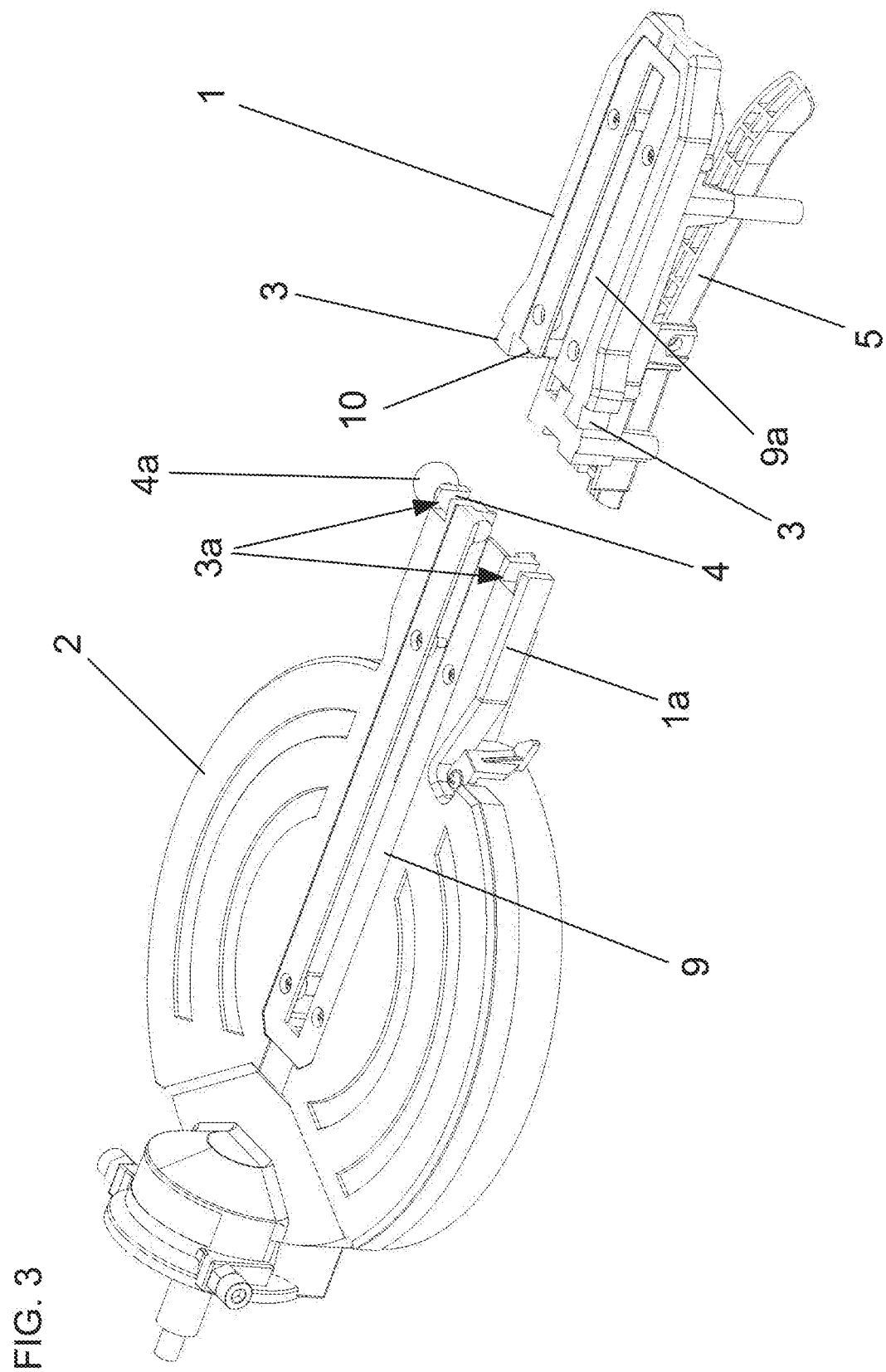
FIG. 3 is a view of the workpiece support shown in FIGS. 1 and 2, corresponding to FIG. 1, but with the radial arm outer portion removed.

An additional locking device 4a, 4 is provided in order to secure the radial arm outer portion 1, which is attached or plugged in onto the radial arm inner portion 1a at the dovetail connection 3, 3a, there with a flush bearing surface. The locking device 4a, 4 has a transverse bolt or cross bar 4 which can be pushed in from the lateral side with a hand knob 4a attached to it, as can best be seen in FIG. 3. The transverse bolt 4 penetrates the two wall areas on the radial arm inner portion 1a, which laterally enclose one of the dovetail receptacles 3a, through a corresponding fitting hole provided there, as well as the associated dovetail projection 3 on the radial arm outer portion 1. Thus, a bolt receptacle 10 is formed by the fitting holes provided on the two wall areas laterally enclosing the one dovetail receptacle 3a and on opening of the associated dovetail projection 3 for penetration by the transverse bolt 4.

The workpiece support or the miter saw provided with the workpiece support can thus be transported in packaging units with small packing dimensions, wherein only the radial arm outer portion 1 has to be attached to the radial arm inner portion 1a and locked with the locking device 4, 4a during commissioning.

A fitting projection 11 on the radial arm outer portion 1 projecting between the two insertion pins 3 towards the workpiece support engages under the radial arm inner portion 1a and fits into a corresponding receptacle on the radial arm inner portion 1a. On the underside of the removable outer section 1 of the radial arm, there is a fixing lever 5, which is part of a fixing device for fixing the workpiece support to the saw stand. The fixing lever 5 projects beyond the radial arm or the radial arm outer section towards the workpiece support. The dovetail receptacles 3a are open at the bottom, but also at the top. The radial arm outer portion 1 can thus be attached to the radial arm inner portion 1a from below.

It is understood that the foregoing description is that of the exemplary embodiments of the invention and that various changes and modifications may be made thereto without departing from the spirit and scope of the invention as defined in the appended claims.

What is claimed is:

1. A workpiece support for a miter saw, the workpiece support suitable for rotatably mounting on a saw stand and for co-rotating fastening of a saw unit thereto, the saw unit having a saw blade lowerable from a position above the workpiece support to a working position, the workpiece support comprising:
    a circular disc-shaped turntable being penetrated by a saw blade slot serving as a passage for the saw blade lowered into the working position, the circular disc-shaped turntable having on one side a holder for fastening the sawing unit, a radial arm extending from the circular disc-shaped turntable and extending the saw blade slot radially outwards on a side opposite the holder in a longitudinal direction of the saw blade slot, wherein a radial arm connection is provided, on which a radially outer radial arm outer portion of the radial arm is detachably attached to a radially inner radial arm inner portion of the radial arm integrally formed with the circular disc-shaped turntable, wherein:
    the radial arm connection is formed as a dovetail connection of the radial arm outer portion with the radial arm inner portion,
    the dovetail connection has on both sides of the saw blade slot one insertion pin formed as a dovetail projection and an associated insertion receptacle formed as a dovetail receptacle, and
    a locking device is provided that detachably locks the radial arm connection, which locking device has a transverse bolt pushed into a bolt receptacle in a direction transverse to the saw blade slot, wherein the bolt inserted into the bolt receptacle reaches through a side wall of the radial arm at least as far as to one of the two inserted insertion pins, but only through one of the inserted insertion pins, such that the saw blade slot arranged laterally adjacent thereto remains free for passage of the saw blade.

2. The workpiece support according to claim 1, wherein the radial arm connection is formed such that the radial arm outer portion is removably attached to the radial arm inner portion from below the radial arm inner portion.

3. The workpiece support according to claim 2, wherein the insertion receptacles are open at a bottom.

4. The workpiece support according to claim 3, wherein the locking device comprises an actuating device.

5. The workpiece support according to claim 3, wherein the locking device comprises an actuating device in the form of a hand knob mounted on the transverse bolt.

6. The workpiece support according to claim 2, wherein the insertion receptacles are open at a top.

7. The workpiece support according to claim 1, wherein a fixing lever, which serves as part of a fixing device for fixing the workpiece support to the saw stand, is mounted on the underside of the radial arm outer portion.

8. The workpiece support according to claim 1, wherein the one insertion pin on each side of the saw blade slot is formed on the radial arm outer portion, and
    wherein the radial arm outer portion has a fitting projection projecting between its two insertion pins towards the circular disc-shaped turntable, which fitting projection engages under the radial arm inner portion and fits into a corresponding receptacle on the radial arm inner portion.

9. The workpiece support according to claim 1, wherein the saw blade slot is surrounded by an exchangeable table insert made of plastic, and wherein the table insert includes at least one turntable side insert piece and at least one radial arm side insert piece.

\* \* \* \* \*